United States Patent
Nelson (10) Patent No.: US 9,974,287 B2
(45) Date of Patent: May 22, 2018

(54) SNAPPING FISH STRINGER

(71) Applicant: Nelson Development Group, LLC, Oklahoma City, OK (US)

(72) Inventor: Jason Nelson, Oklahoma City, OK (US)

(73) Assignee: NELSON DEVELOPMENT GROUP, LLC, Oklahoma City, OK (US)

( * ) Notice: Subject to any disclaimer, the term of this patent is extended or adjusted under 35 U.S.C. 154(b) by 298 days.

(21) Appl. No.: 14/453,531

(22) Filed: Aug. 6, 2014

(65) Prior Publication Data
US 2015/0040465 A1 Feb. 12, 2015

Related U.S. Application Data

(60) Provisional application No. 61/863,719, filed on Aug. 8, 2013.

(51) Int. Cl.
*A01K 65/00* (2006.01)

(52) U.S. Cl.
CPC .................. *A01K 65/00* (2013.01)

(58) Field of Classification Search
CPC ...... A01K 65/00; A01K 27/00; A01K 27/001; A01K 27/005; A01K 27/008; Y10T 24/45178; Y10T 24/45183; Y10T 24/45215; Y10T 24/46502; Y10T 24/45675; A01M 31/006; A22C 25/10; A62B 35/00; A44B 11/00
USPC ............ 43/54.1, 55; 224/103; 119/769, 119/856–865, 712, 770, 771, 792, 793, 119/794, 795, 796, 797, 798; 63/15.7
See application file for complete search history.

(56) References Cited

U.S. PATENT DOCUMENTS

| | | | | |
|---|---|---|---|---|
| 432,626 A * | 7/1890 | Killinger | ............... | E21B 17/023 24/643 |
| 813,838 A * | 2/1906 | Steinberg | ........... | A44B 17/0011 12/123 |
| 827,855 A * | 8/1906 | Farmer | .................. | A01K 65/00 224/103 |
| 878,626 A * | 2/1908 | Guilford | ................ | A01K 65/00 224/103 |
| 1,176,177 A * | 3/1916 | Sparks | .................... | A01K 65/00 16/DIG. 12 |
| 1,341,722 A * | 6/1920 | Putney | .................... | A01K 65/00 184/27.1 |
| 1,407,221 A * | 2/1922 | Reimers | ................. | A01K 65/00 211/59.1 |
| 1,417,759 A * | 5/1922 | McNiece | ............... | A01K 65/00 224/103 |
| 1,435,064 A * | 11/1922 | Holmes | .................. | B60D 1/155 24/116 R |
| 1,447,429 A * | 3/1923 | Reimers | ................. | A01K 65/00 24/600.9 |

(Continued)

*Primary Examiner* — Darren W Ark
*Assistant Examiner* — Morgan T Barlow (57) ABSTRACT

A fish stringer has a locking body, an insert received in the locking body and a loop connected to the locking body and the insert. An insert-receiving cavity traverses into the locking body. The insert has a handle portion to be manipulated and a tongue portion within the insert-receiving cavity. A latching mechanism on the insert engages a latch receptacle on the locking body. The latching mechanism is a flexible arm with a tab. The flexible arm is deformed from an equilibrium position as the tab engages with the latch receptacle.

1 Claim, 10 Drawing Sheets

(56) References Cited

U.S. PATENT DOCUMENTS

| | | | | |
|---|---|---|---|---|
| 1,701,112 A * | 2/1929 | Johnson | A44C 5/2038 | 24/643 |
| 1,767,451 A * | 6/1930 | Hedge | B60C 27/08 | 152/236 |
| 1,915,847 A * | 6/1933 | Brant | H02G 15/26 | 138/99 |
| 1,975,754 A * | 10/1934 | Pflueger | A01K 65/00 | 224/103 |
| 1,975,864 A * | 10/1934 | Plasters | A01K 65/00 | 224/103 |
| 2,045,282 A * | 6/1936 | Metcalf | A44C 5/22 | 24/68 J |
| 2,437,331 A * | 3/1948 | Murray | A01K 65/00 | 224/103 |
| 2,441,450 A * | 5/1948 | Smigleski | A01K 65/00 | 224/103 |
| 2,453,381 A * | 11/1948 | Orton | A01K 65/00 | 224/103 |
| 2,455,766 A * | 12/1948 | Harvey | A01K 65/00 | 224/103 |
| 2,483,072 A * | 9/1949 | Stonich | A01K 65/00 | 224/103 |
| 2,491,008 A * | 12/1949 | Lake | A01K 97/10 | 224/103 |
| 2,506,839 A * | 5/1950 | Mead | A01K 65/00 | 224/103 |
| 2,518,541 A * | 8/1950 | Griffin | A01K 65/00 | 224/103 |
| 2,523,974 A * | 9/1950 | Stonich | A01K 65/00 | 224/103 |
| 2,539,496 A * | 1/1951 | Towey | A01K 65/00 | 224/103 |
| 2,563,480 A * | 8/1951 | Montgomery | A01K 65/00 | 224/103 |
| 2,567,775 A * | 9/1951 | Loree | A22C 25/10 | 224/103 |
| 2,572,653 A * | 10/1951 | Mulsow | A01K 65/00 | 224/103 |
| 2,592,389 A * | 4/1952 | Budy | A01K 65/00 | 224/103 |
| 2,599,057 A * | 6/1952 | Jarabek | A01K 65/00 | 224/103 |
| 2,734,671 A * | 2/1956 | Adams | A01K 65/00 | 224/103 |
| 2,738,562 A * | 3/1956 | Sharps | A01K 65/00 | 224/103 |
| 2,800,263 A * | 7/1957 | Hunt | A01K 65/00 | 224/103 |
| 2,865,544 A * | 12/1958 | Christowski | A01K 65/00 | 224/103 |
| 2,950,888 A * | 8/1960 | Cottrill | A01K 65/00 | 224/103 |
| 3,137,421 A * | 6/1964 | Haddock | A01K 65/00 | 224/103 |
| 3,160,336 A * | 12/1964 | Flatford | A01K 65/00 | 224/103 |
| 3,165,806 A * | 1/1965 | Lehman | A44B 11/2511 | 24/650 |
| 3,332,121 A * | 7/1967 | Curtis | A01K 65/00 | 224/103 |
| 3,540,637 A * | 11/1970 | Robins | A01K 65/00 | 224/103 |
| 3,696,647 A * | 10/1972 | Balicki | E05B 67/003 | 70/417 |
| 3,772,645 A * | 11/1973 | Odenz | B62H 5/003 | 200/61.52 |
| 3,808,847 A * | 5/1974 | Vesely | E05B 67/003 | 70/18 |
| 3,854,638 A * | 12/1974 | Anderson | A01K 65/00 | 224/103 |
| 3,858,991 A * | 1/1975 | Burtelson | E04C 5/122 | 24/115 M |
| 3,879,721 A * | 4/1975 | Yereance | E05B 45/02 | 116/67 R |
| 4,090,651 A * | 5/1978 | Raquel | A01K 65/00 | 224/103 |
| 4,110,874 A * | 9/1978 | Gaylord | B64D 17/32 | 24/606 |
| 4,308,643 A * | 1/1982 | Montplaisir | A01K 65/00 | 224/103 |
| 4,325,238 A * | 4/1982 | Scherbing | E05B 67/003 | 70/18 |
| 4,763,490 A * | 8/1988 | Bruner | A44C 5/2076 | 24/615 |
| 4,827,661 A * | 5/1989 | Wendler | A01K 65/00 | 224/103 |
| 4,879,883 A * | 11/1989 | Bruner | A44C 5/2076 | 267/158 |
| 5,010,746 A * | 4/1991 | Zane | E05B 67/063 | 70/233 |
| 5,025,587 A * | 6/1991 | Creed | A01K 65/00 | 224/103 |
| 5,078,310 A * | 1/1992 | Ferry | A01K 65/00 | 224/103 |
| 5,114,058 A * | 5/1992 | Davis | A01K 65/00 | 224/103 |
| 5,291,765 A * | 3/1994 | Hoisington | B62H 5/003 | 70/18 |
| 5,471,716 A * | 12/1995 | Takahashi | A44B 11/263 | 24/589.1 |
| 5,659,981 A * | 8/1997 | Liautaud | A63C 13/001 | 36/122 |
| 5,788,400 A * | 8/1998 | Wey | F16B 7/0413 | 24/589.1 |
| 5,803,413 A * | 9/1998 | Benoit | B65D 63/1072 | 24/16 PB |
| 5,868,012 A * | 2/1999 | Chun-Te | E05B 37/14 | 70/30 |
| 6,026,664 A * | 2/2000 | Lin | E05B 67/003 | 70/18 |
| 6,095,094 A * | 8/2000 | Phillips | A01K 27/001 | 119/792 |
| 6,145,171 A * | 11/2000 | Hoshino | A44C 5/2052 | 24/587.1 |
| 6,154,936 A * | 12/2000 | Howell | A44B 11/006 | 24/615 |
| 6,163,942 A * | 12/2000 | Liao | A44B 11/266 | 24/591.1 |
| 6,227,016 B1 * | 5/2001 | Yu | E05B 37/025 | 70/30 |
| 6,371,056 B1 * | 4/2002 | Phillips | A01K 27/001 | 119/769 |
| 6,421,949 B1 * | 7/2002 | Schytte | A01K 91/06 | 43/43.12 |
| 6,470,718 B1 * | 10/2002 | Yang | E05B 67/003 | 70/25 |
| 6,481,250 B1 * | 11/2002 | Kuo | E05B 17/14 | 70/367 |
| 6,484,376 B1 * | 11/2002 | Khatchadourian | A44C 5/2052 | 24/116 A |
| 6,508,080 B1 * | 1/2003 | Ninomiya | A44C 5/2042 | 24/574.1 |
| 6,571,434 B2 * | 6/2003 | Ortiz | A44B 11/006 | 24/265 BC |
| 6,715,185 B2 * | 4/2004 | Angellotti | F16B 5/065 | 24/297 |
| 6,923,027 B1 * | 8/2005 | Kuo | E05B 67/003 | 70/233 |
| 7,082,651 B2 * | 8/2006 | Ninomiya | A44C 5/2052 | 24/616 |
| 7,350,385 B1 * | 4/2008 | Book | A44B 15/005 | 206/37.5 |
| 7,357,282 B2 * | 4/2008 | Brull | A01K 65/00 | 224/103 |
| 7,370,608 B1 * | 5/2008 | Friedman | A01K 13/006 | 119/850 |
| 7,387,087 B2 * | 6/2008 | Lady | A01K 27/002 | 119/792 |

(56) References Cited

U.S. PATENT DOCUMENTS

| | | | | |
|---|---|---|---|---|
| 7,788,774 B1* | 9/2010 | Cravey | A44C 5/2057 | 24/587.11 |
| 7,878,024 B2* | 2/2011 | Baik | A44C 7/00 | 24/574.1 |
| 7,966,704 B2* | 6/2011 | Yurman | A44C 5/2028 | 24/598.1 |
| 8,061,340 B2* | 11/2011 | Mitchell | F41B 5/1469 | 124/35.2 |
| 8,151,604 B2* | 4/2012 | Thomas | E05B 67/003 | 70/14 |
| 8,191,212 B2* | 6/2012 | Woods | A01K 27/005 | 24/615 |
| 8,683,959 B2* | 4/2014 | Friedland | A01K 1/04 | 119/792 |
| 8,726,850 B2* | 5/2014 | Rosenquist | A44B 11/263 | 119/863 |
| 8,919,293 B2* | 12/2014 | Cromwell | A01K 27/001 | 119/794 |
| 9,433,188 B2* | 9/2016 | Cuthbertson | A01K 1/04 | |
| 2002/0117121 A1* | 8/2002 | Sporn | A01K 27/00 | 119/856 |
| 2002/0166351 A1* | 11/2002 | Lee | E05B 67/003 | 70/49 |
| 2002/0194887 A1* | 12/2002 | Chang | E05B 67/063 | 70/38 B |
| 2003/0121129 A1* | 7/2003 | Hamilton | A44B 11/266 | 24/615 |
| 2004/0140331 A1* | 7/2004 | Yarbrough | A01K 65/00 | 224/103 |
| 2005/0044903 A1* | 3/2005 | Ling | E05B 67/003 | 70/30 |
| 2005/0051676 A1* | 3/2005 | Del Sordo, Jr. | H02G 3/30 | 248/74.3 |
| 2005/0251895 A1* | 11/2005 | Farrah | A41D 1/08 | 2/227 |
| 2005/0263548 A1* | 12/2005 | Brull | A01K 65/00 | 224/103 |
| 2006/0162134 A1* | 7/2006 | Sun | A44B 11/2592 | 24/265 AL |
| 2007/0006823 A1* | 1/2007 | Sandberg | A01K 15/021 | 119/856 |
| 2007/0062012 A1* | 3/2007 | Caison | A44B 11/263 | 24/302 |
| 2008/0022734 A1* | 1/2008 | McDaid | B62H 5/00 | 70/233 |
| 2008/0066502 A1* | 3/2008 | Sheehan | E05B 45/005 | 70/49 |
| 2008/0184748 A1* | 8/2008 | Burmesch | E05B 37/025 | 70/26 |
| 2009/0133233 A1* | 5/2009 | Nessel | B60R 13/0206 | 24/589.1 |
| 2009/0229537 A1* | 9/2009 | Muelken | A01K 27/001 | 119/792 |
| 2010/0307204 A1* | 12/2010 | Yu | E05B 37/025 | 70/58 |
| 2010/0314930 A1* | 12/2010 | Akaike | A44B 11/2523 | 297/468 |
| 2011/0154624 A1* | 6/2011 | Arnold | A44B 11/2561 | 24/593.1 |
| 2011/0174239 A1* | 7/2011 | Fricker | A01K 27/005 | 119/865 |
| 2011/0277700 A1* | 11/2011 | Friedland | A01K 1/04 | 119/792 |
| 2012/0036683 A1* | 2/2012 | Thoi | F16G 11/00 | 24/122.6 |
| 2012/0085134 A1* | 4/2012 | Ezzo | E05B 73/0017 | 70/15 |
| 2012/0103278 A1* | 5/2012 | Friedland | A01K 1/04 | 119/792 |
| 2012/0304942 A1* | 12/2012 | Louro | A01K 27/005 | 119/792 |
| 2012/0325164 A1* | 12/2012 | Finlan | A01K 27/001 | 119/863 |
| 2013/0000179 A1* | 1/2013 | Dickey | A01K 65/00 | 43/55 |
| 2013/0036777 A1* | 2/2013 | Lin | G01G 19/58 | 70/30 |
| 2013/0087105 A1* | 4/2013 | Cuthbertson | A01K 1/04 | 119/794 |
| 2013/0105748 A1* | 5/2013 | Bukovac | H02G 1/06 | 254/134.3 R |
| 2013/0174616 A1* | 7/2013 | Allen, Jr. | E05B 37/025 | 70/30 |
| 2013/0269629 A1* | 10/2013 | Holt, Jr. | A44B 11/00 | 119/863 |
| 2015/0000613 A1* | 1/2015 | Cooke | A01K 27/003 | 119/795 |
| 2015/0020558 A1* | 1/2015 | Williams | B62H 5/00 | 70/18 |
| 2015/0040465 A1* | 2/2015 | Nelson | A01K 65/00 | 43/55 |

* cited by examiner

SNAPPING FISH STRINGER

The current application claims a priority to the U.S. Provisional Patent application Ser. No. 61/863,719 filed on Aug. 8, 2013.

FIELD OF THE INVENTION

The present invention relates generally to fishing gear. More specifically, the present invention is a snapping fish stringer which is designed to facilitate the holding of caught fish on the person of a fisherman. The present invention is specially adapted to allow easy addition of new fishes to the stringer by way of its snapping design. Furthermore the present invention can be attached to the fisherman's person such that the string extends down past their waist. This is particularly useful for fly fishing as often the fisherman is waist deep in water, and any fish which are caught will remain in the water on the present invention for the duration of the fishing, thus keeping them alive and fresh.

BACKGROUND OF THE INVENTION

Fishing is a favorite pastime of many people who live near streams, rivers, lakes, or other bodies of water which harbor environments that are suitable for populations of fish to live in. There are several different reasons as to why people fish, with the two main reasons being for enjoyment and food. Many people consider fishing to be an extremely relaxing activity, no doubt partially due to the relaxed nature of the task, and the natural surroundings in which the activity of fishing often places the fisherman. Fishing often takes place on the bank of a river or lake, on a pier, in a stream or river, or on a boat. Most of these locations are typically considered to be very calm and serene, or at the very least, highly enjoyable to the senses. The fisherman is usually able to feel a reconnection with nature by way of the activity of fishing and the locations where it is performed. This reconnection with nature is one of the major driving factors in why fishing is such a popular activity, especially in the summer months. In the modernized world, people live surrounded by technology which drives a hectic and fast paced way life which is even more exaggerated when living in a metropolitan area such as a city. People who have personally experienced this way of life can tell you that eventually it can get extremely annoying and stressful when sustained for long periods of time. Fishing allows people to take a step back from the modernized world and relax in nature by performing an activity that is an ancient human art, and requires only the most basic of mechanical technology in order to perform. This fact is the main reason why fishing is often performed by individuals as a favored pastime, and fishing for this purpose is often referred to as recreational fishing; it is however not the only reason to fish.

The other reason to fish, and perhaps more important reason to fish in many parts of the world, is a more basic and primal reason; to obtain food. Fish is well known as an excellent source of protein and many vitamins and minerals which are vital to human survival. As a result of this fact, fish serves as the main source of protein in many cultures diets, even to this very day. Societies which have developed near bodies of water which support large populations of marine animals have inevitably developed a taste for fish, as it is an excellent primary source of protein. There are many different techniques which have been developed to catch fish in quantities large enough to support the protein needs of a village; this is often referred to as subsistence fishing, and is still practiced in many parts of the world where fish are the most readily available source of protein.

Fishing for food can be broken down into two main groups, commercial fishing, and traditional fishing. Commercial fishing is characterized as any large scale operation in which extremely large quantities of fish are caught in order to be shipped and sold around the world. Commercial fishing often makes use of large boats referred to as fishing boats, which are equipped with massive booms and nets which they drag in the water in order to catch huge quantities of fish efficiently. Traditional fishing by contrast is a much smaller operation and usually involves only a handful or one individual making use of tried and true fishing equipment to catch a small to moderate amount of fish for personal consumption or local sale. As such, recreational fishing itself falls under the umbrella of what can be considered to be traditional fishing, particularly if the recreational fisherman intends to keep and consume the fish that they catch. Some of the traditional methods which were developed to catch fish, and are still in use today, include hand net fishing, trap fishing, bow and arrow fishing, spear fishing, and angling.

Angling is perhaps one of the most common forms of fishing used in recreational fishing in the modern world. Modern angling typically involves the use of a line with a sharpened hook at the end, with the line is run through what is known as a fishing rod. The fishing rod comprises a rod and a reel. The rod helps to guide the line and give the fisherman greater control over the line while the reel is intended to store excess line, release line, and pull in the line when necessary. There are several subgroups of angling with a rod, perhaps the most common of which being fly fishing. Fly fishing typically involves the use of a specialized fishing rod and lures called flies. This specialized equipment is coupled with a unique casting technique to lure the fish into striking the fly, thus allowing the fisherman to land the fish if the situation is handled properly. One of the iconic characteristics of fly fishing, particularly freshwater fly fishing, is the fact that the fisherman often wades out some distance into the water in order to better reach areas where fish are likely to be located.

The fact that the fisherman is usually in the water during the fly fishing presents a unique challenge to one simple question; what does the fisherman do with the fish they have caught before they return to shore? The answer is typically an apparatus known as a stringer. A stringer is a simple apparatus which comprises a line with a ring on one end and a dull spike on the other. This line is often secured to the fisherman's vest at one end, and tied shut with the other end. When a fish is caught, the stringer line is untied and then run through the fish's mouth, out through the gills, and then retied to the fisherman's vest, thereby securing the fish and also allowing the fish to remain in the water if the stringer line is long enough. This is an effective method of keeping fish caught by the fisherman before returning to shore, however it suffers from a number of disadvantages. First and foremost, it is rather difficult for a fisherman to untie the end of a thin line when one is knee or even waist deep in sometimes running water with no way to put down their fishing rod. The second issue is the fact that the lines used in stringers are often uncovered and can be rough in texture. This can not only make it difficult to slide the fish down the line, but also has the potential to damage the gills of the fish, thus possibly causing it to die earlier. It is resultantly an object of the present invention to solve the issues mentioned above by introducing a snapping fish stringer which can be easily opened and then secured closed again, thereby making it very easy to load fish onto the line. It is a further object of the present invention to ensure that the fish quickly and easily slides along the line, thereby decreasing difficult for the user, and decreasing trauma on the fish.

DETAIL DESCRIPTIONS OF THE INVENTION

All illustrations of the drawings are for the purpose of describing selected versions of the present invention and are not intended to limit the scope of the present invention.

Figure 1:
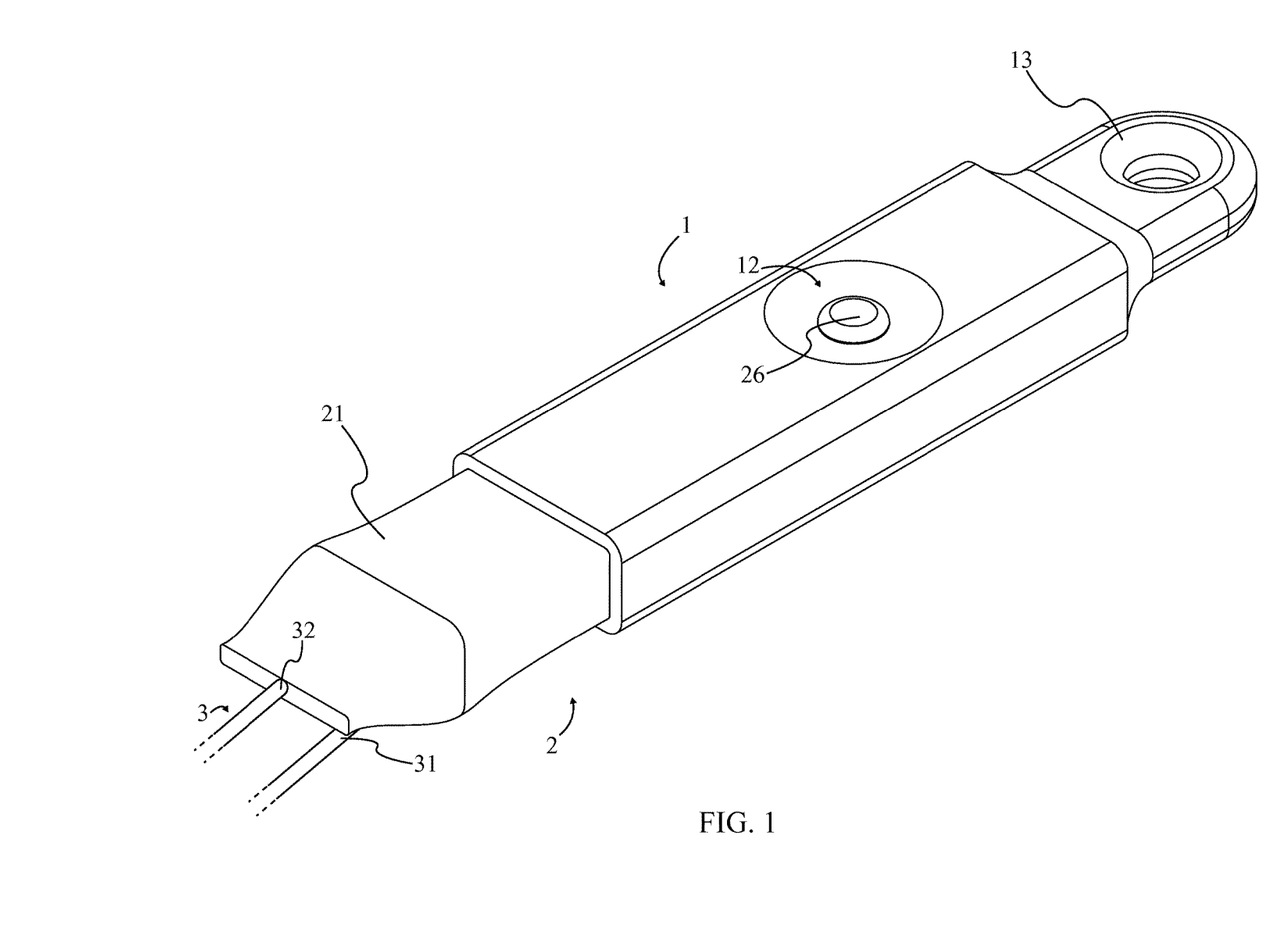
FIG. 1 is a perspective view of the present invention.
Figure 2:
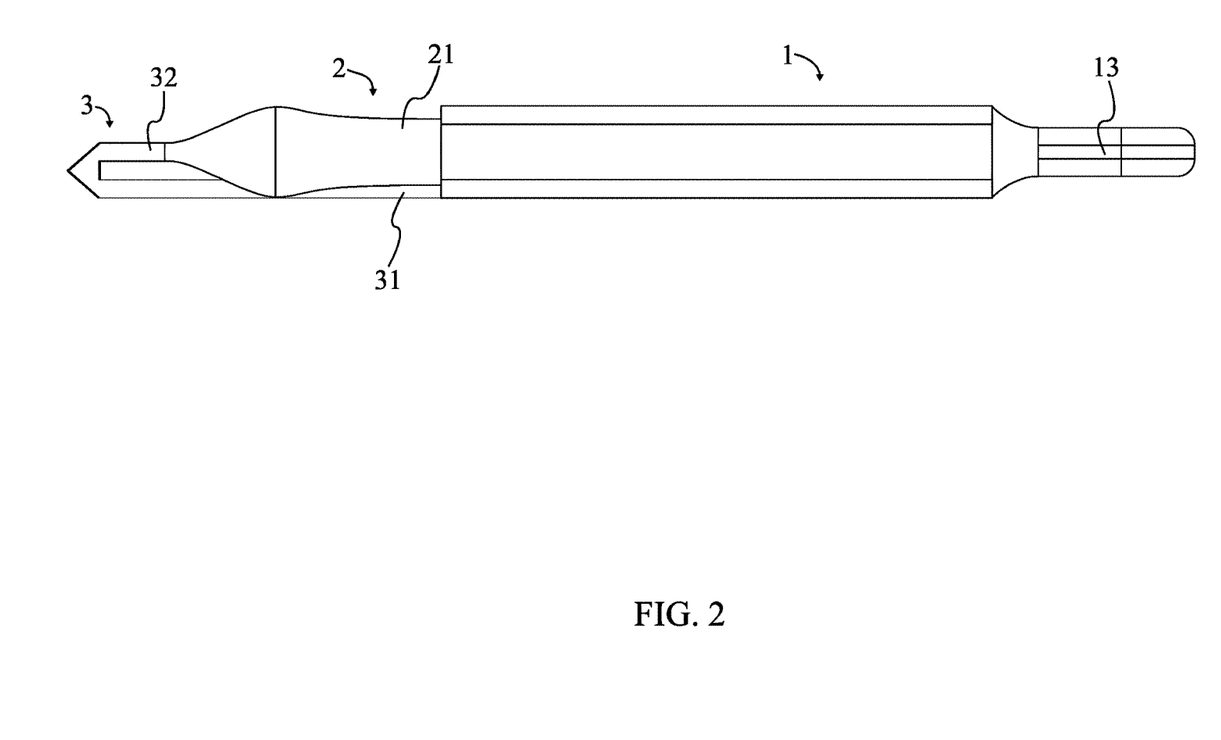
FIG. 2 is a lateral view of the present invention.
Figure 3:
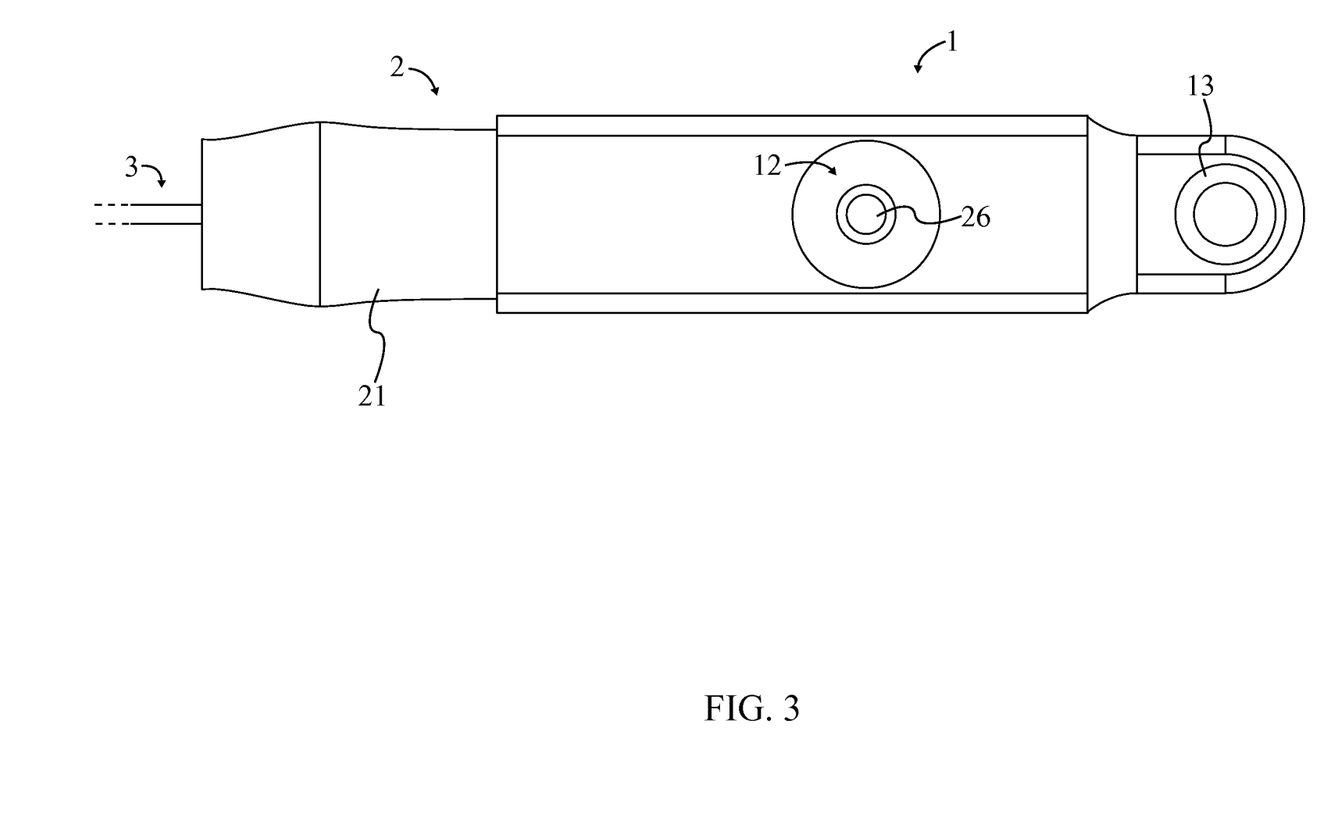
FIG. 3 is a top view of the present invention.

The present invention is a snapping fish stringer which is specifically designed with usability in mind; more specifically, it is intended to be incredibly easy to open and close such that fish can be added to the stringer with extreme ease. The present invention makes use of components which snap together to create a closed loop for holding fish which can be quickly and easily opened and closed. The present invention also makes use of a specially coated wire to enable fish to slide free on the wire, making it much easier for the fisherman to load fish onto and off of the present invention, as well as making the experience less traumatic for the fish and hopefully increasing its chances of survival until it can be gutted and cleaned. To this end the present invention comprises a locking body 1, an insert 2, and a cable 3 which is connected to the locking body 1 at a first end 31 and the insert 2 at a second end 32. A closed loop (e.g. the "stringer") can be created by placing the insert 2 into the locking body 1. The locking body 1, insert 2, and cable 3 of the present invention are illustrated together through FIG. 1, FIG. 2, and FIG. 3.

Figure 4:
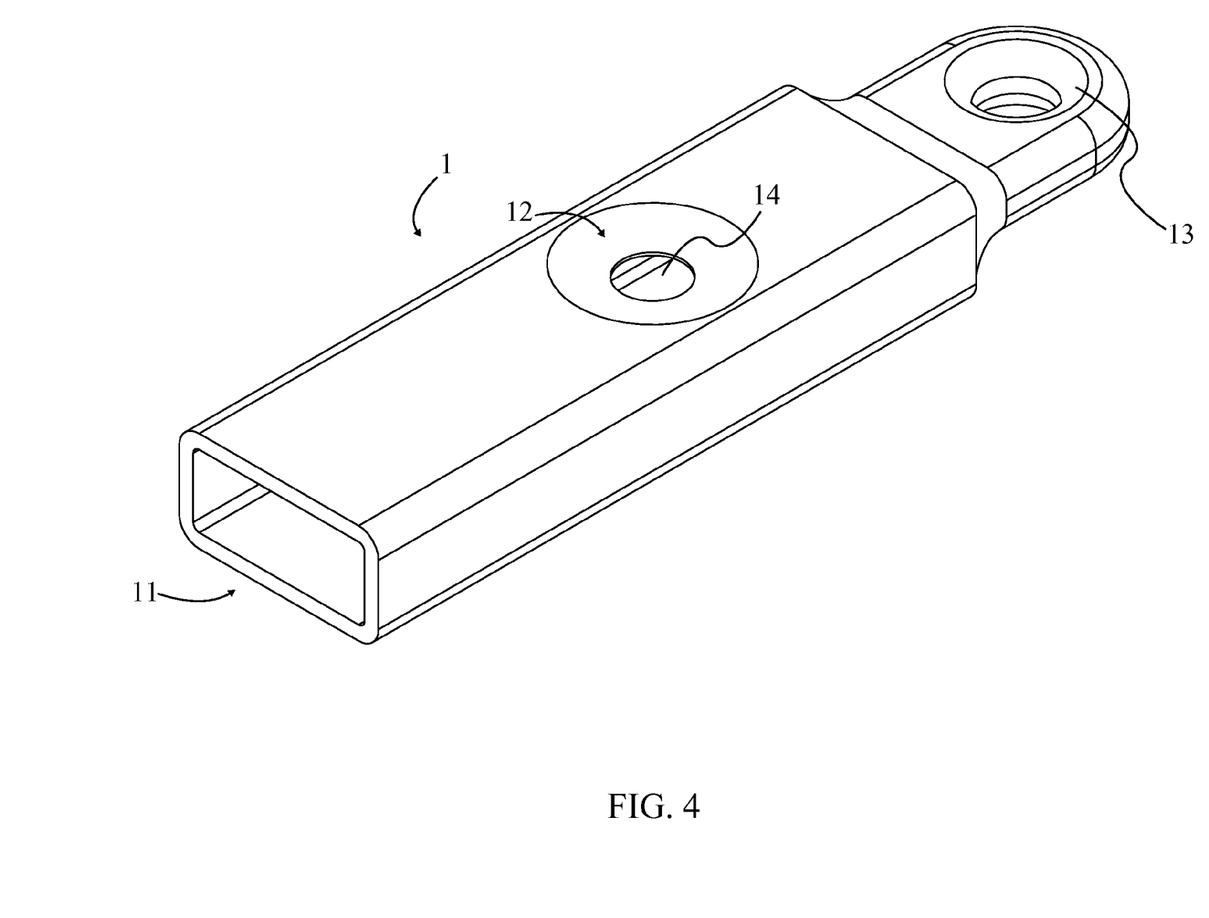
FIG. 4 is a perspective of a locking body of the present invention.
Figure 5:
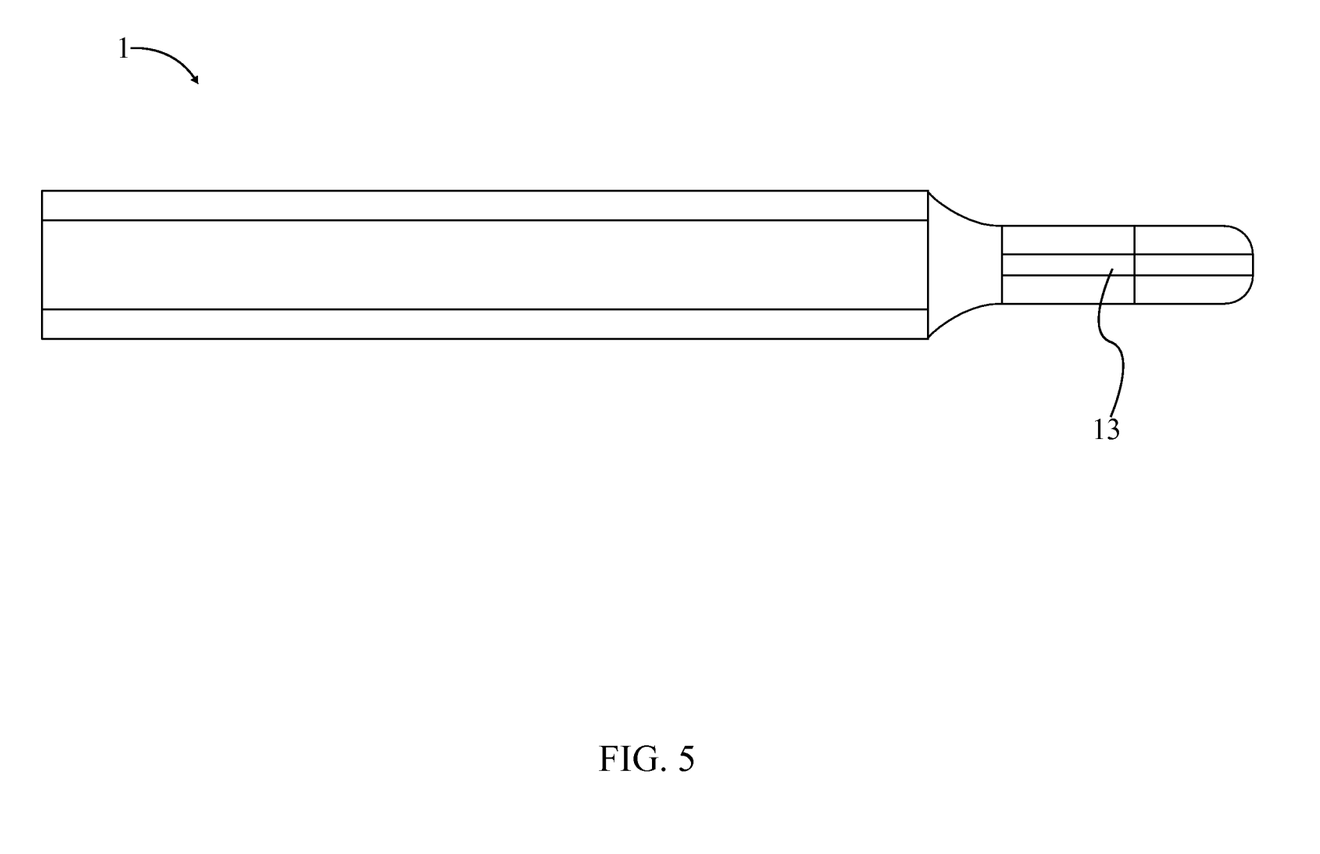
FIG. 5 is a lateral view of the locking body of the present invention.
Figure 6:
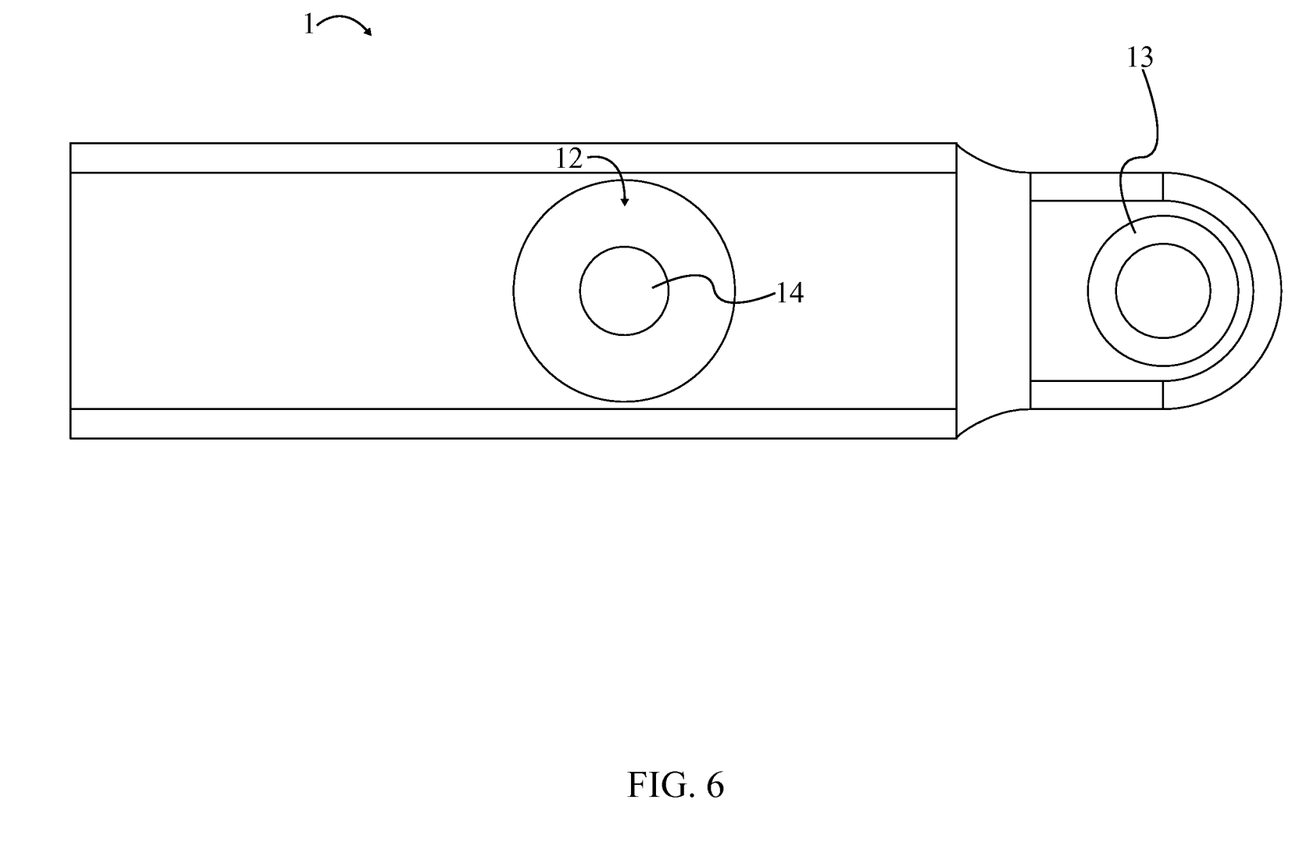
FIG. 6 is a top view of the locking body of the present invention.

To allow the insert 2 to be easily connected and disconnected from the locking body 1, several components are utilized by the present invention. The locking body 1 itself comprises an insert-receiving cavity 11, a latch receptacle 12, and a ring 13. The insert-receiving cavity 11, which is designed to interface with the insert 2, traverses into the locking body 1 in order to create a space for the insert 2 within the locking body 1. The latch receptacle 12 is provided to help secure the insert 2 in the insert-receiving cavity 11. Thus, the latch receptacle 12 is engaged with a corresponding part of the insert 2. Since the latch receptacle 12 is designed to interface with a part of the insert 2, said latch receptacle 12 is positioned adjacent to the insert-receiving cavity 11. The ring 13 is delineated by a ring hole that traverses through the locking body 1. The ring 13 is positioned at one end of the locking body 1, opposite the insert-receiving cavity 11. This allows the ring 13 to be used to secure other items without interfering with the connection and disconnection of the insert 2 with the locking body 1.

For example, the ring 13 can be used to connect a rope, a carabiner, or other types of fasteners that correspondingly attach the present invention to a fixed point. This is desirable as it allows the present invention to be better utilized in a number of situations; it can be secured to a pier, to a fisherman's jacket, to a belt, to a pole, and numerous other objects. The aforementioned fasteners and attachment points are just a few examples of possibilities enabled by the present invention and are not meant to limit the use of other unmentioned fasteners and attachment points. Components of the locking body 1 are illustrated via FIG. 4, FIG. 5, and FIG. 6.

Figure 7:
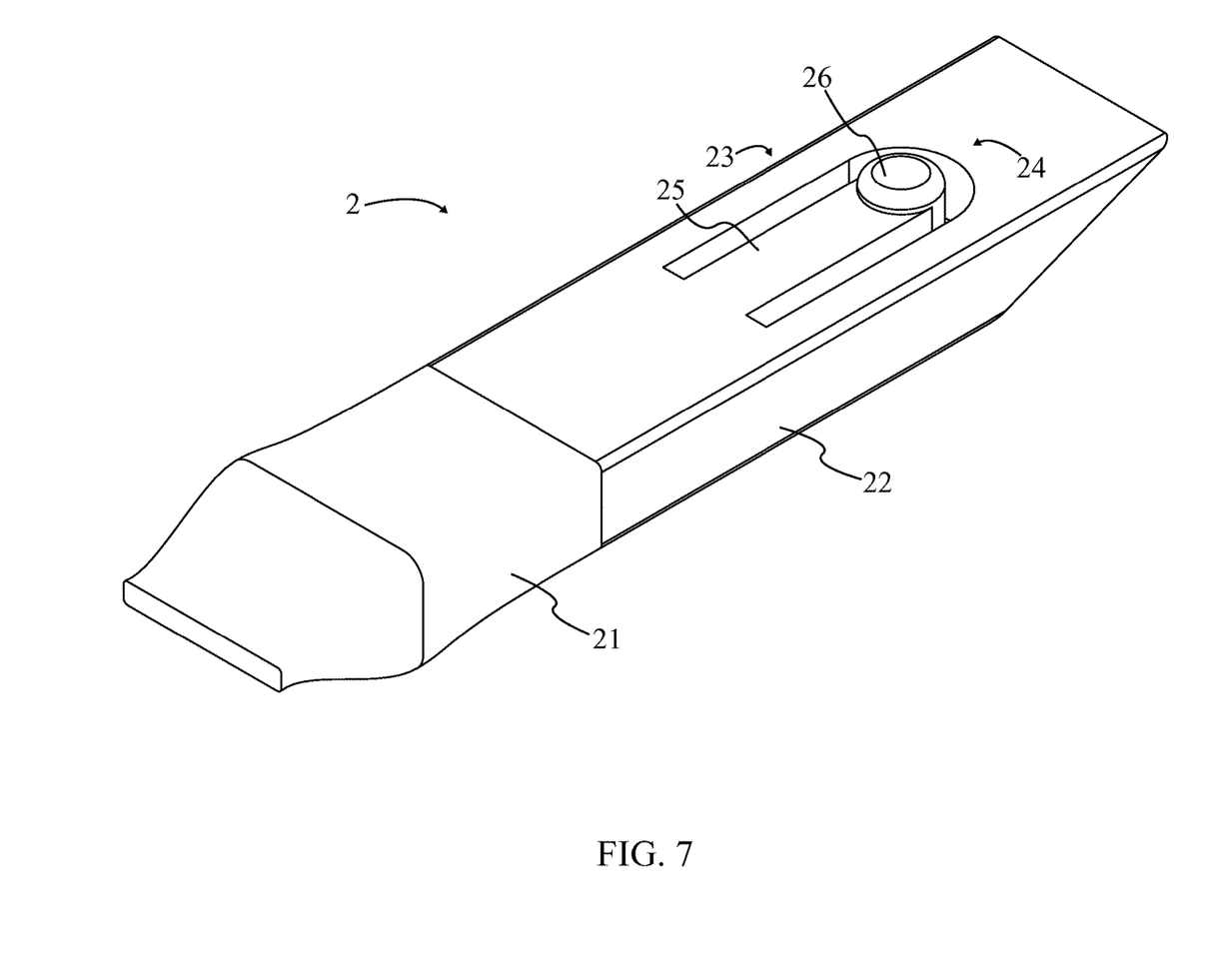
FIG. 7 is a perspective view of an insert of the present invention.
Figure 8:
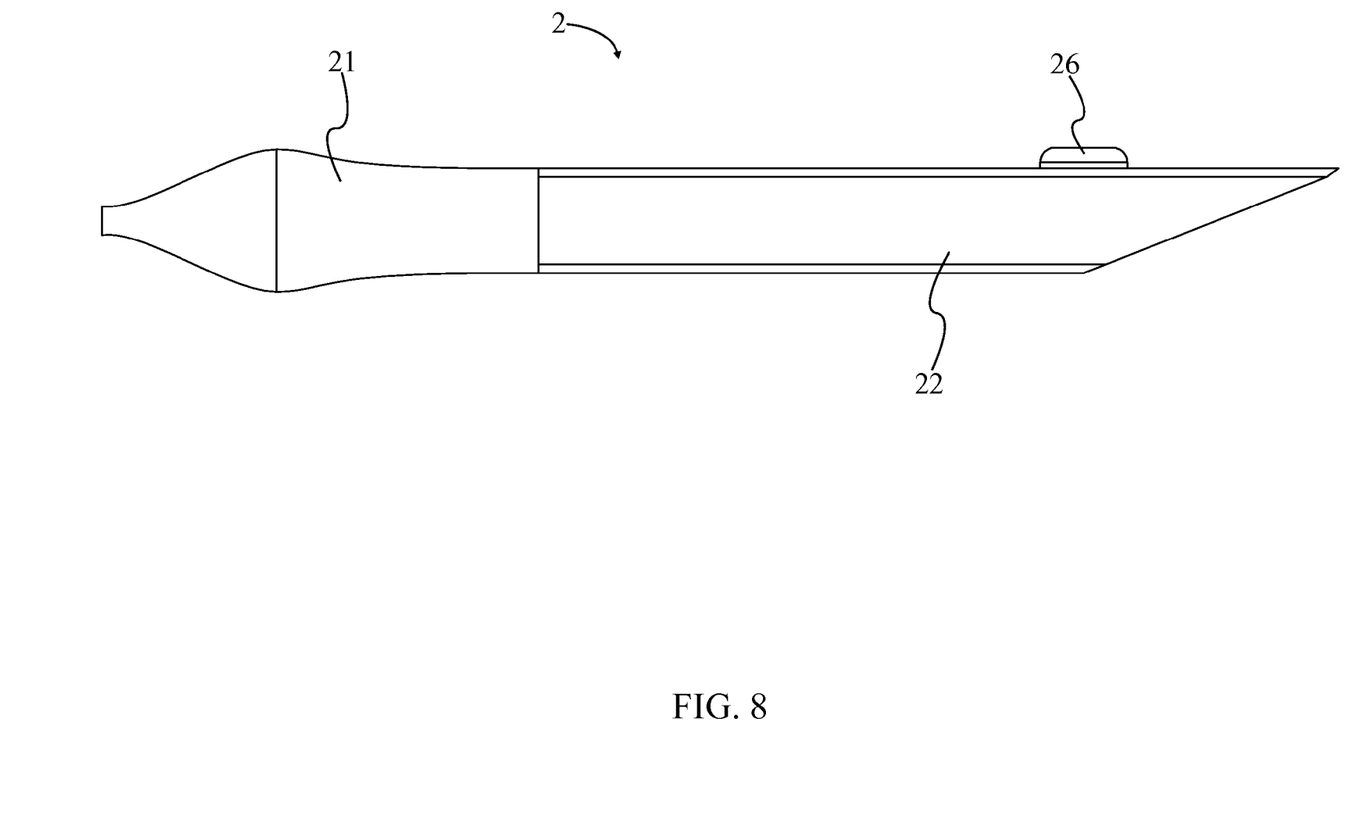
FIG. 8 is a lateral view of the insert of the present invention.
Figure 9:
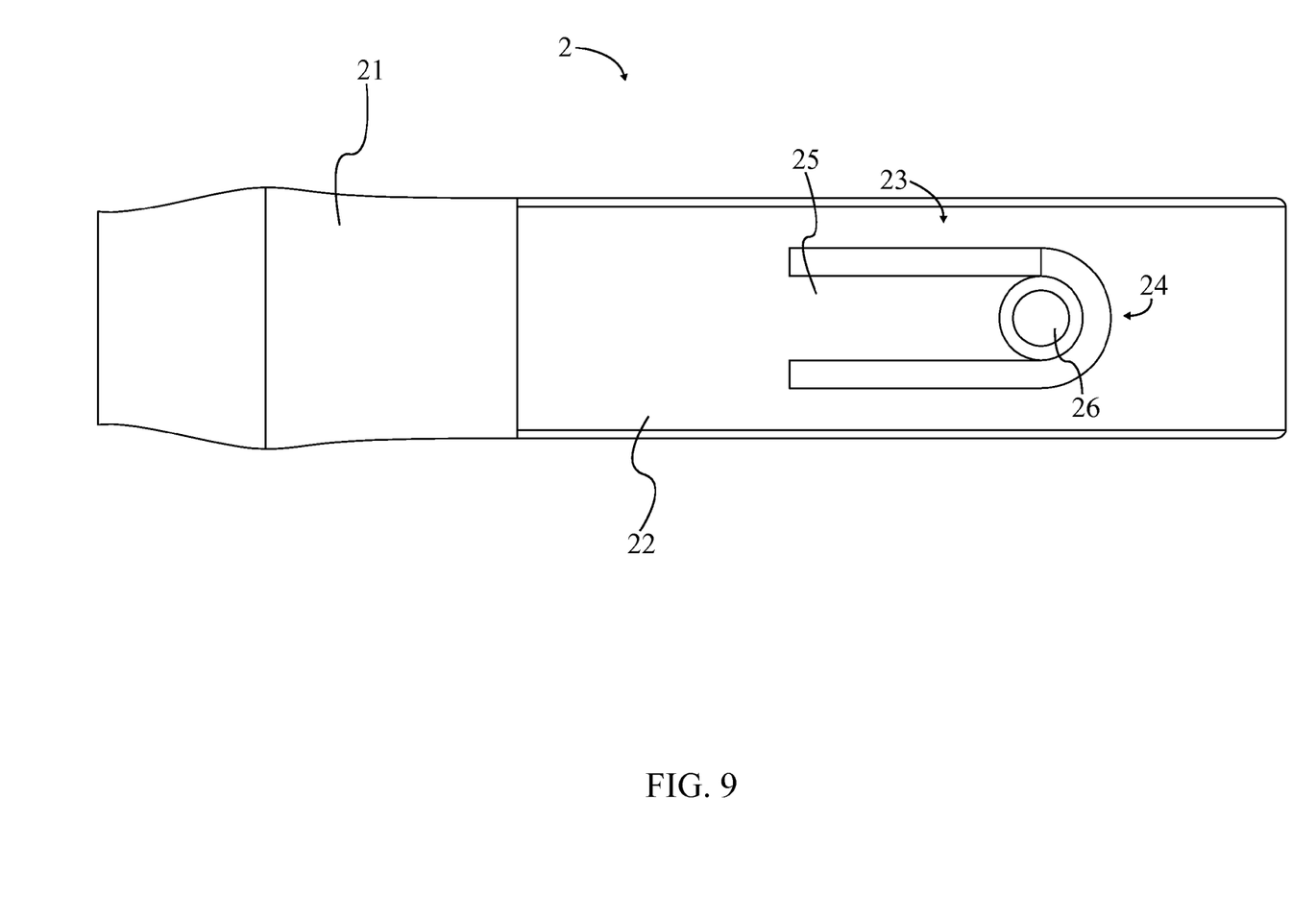
FIG. 9 is a top view of the insert of the present invention.

The insert 2 itself comprises a handle portion 21, a tongue 22, and a latching mechanism 23. The handle portion 21 provides an ergonomic grip that makes it easier for a user to interact with the insert 2. The tongue 22 is adjacently connected to the insert 2 and is positioned in the insert-receiving cavity 11. The combination of the handle portion 21 and the tongue 22 enables a user to easily connect and disconnect the insert 2 from the locking body 1. The handle portion 21 serves as an easily grasped component that is accessible by a user even while the tongue 22 is positioned in the insert-receiving cavity 11. As a result a user is better able to operate the present invention with one hand, as is beneficial when fishing. The latching mechanism 23 serves to secure the insert 2 with the locking body 1 by interfacing with the latch receptacle 12. When the tongue 22 is positioned in the insert-receiving cavity 11, the latching mechanism 23 engages with the latch receptacle 12 to prevent movement of the tongue 22 relative to the insert-receiving cavity 11. This ensures that the created loop remains closed, keeping any fish that have been caught secured via the present invention. Components of the insert 2 are illustrated via FIG. 7, FIG. 8, and FIG. 9.

Figure 10:
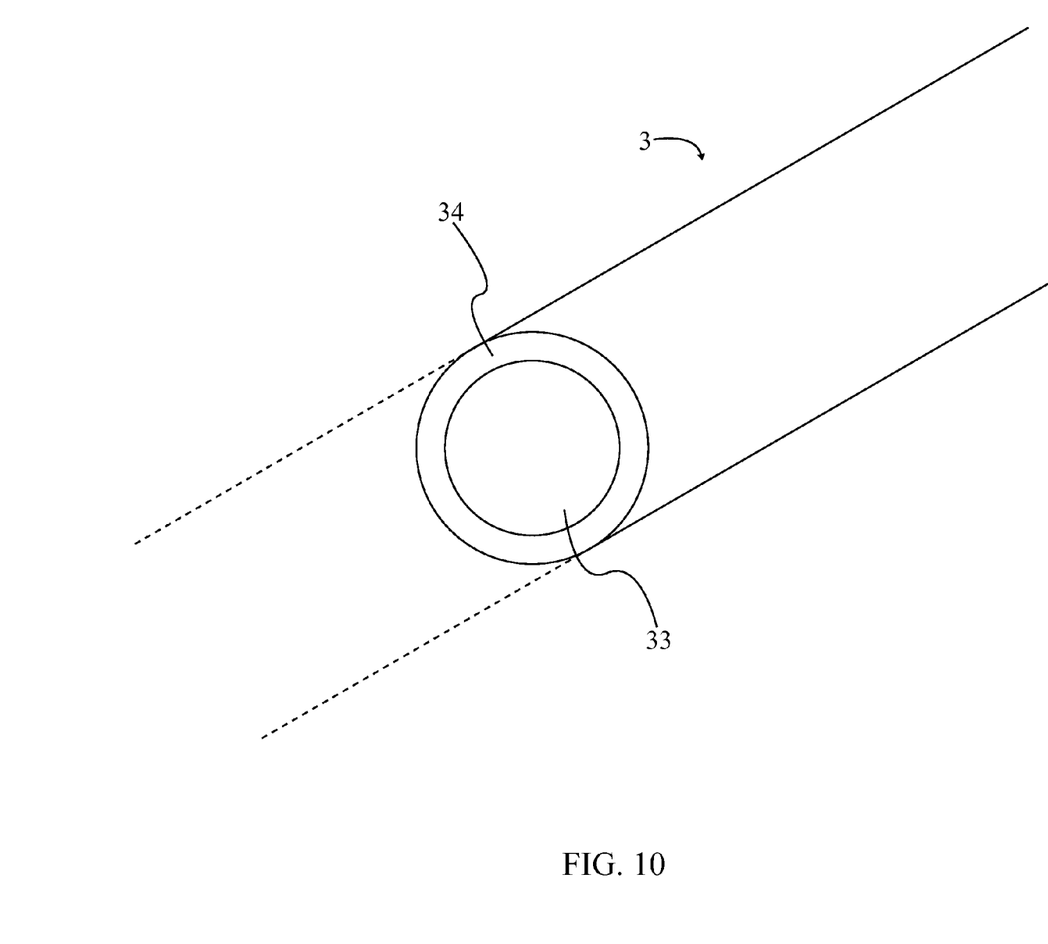
FIG. 10 is a perspective view showing an interior section of a cable of the present invention.

The cable 3 comprises a first end 31 connected to the locking body 1 and a second end 32 connected to the insert 2. As earlier referenced, the cable 3 is used to form a closed loop that securely holds any caught fish. When the insert 2 is connected to the locking body 1, the first end 31 and second end 32 are ideally parallel to each other. This parallel configuration reduces the likelihood of tangles in the cable 3 and resultantly makes the present invention easier to operate, especially with only one hand. The parallel configuration also directs the coated wire downwards and out of the way of the mobility of the user. To make it easier for a user to slide fish along the cable 3, the cable 3 comprises a flexible inner body 33 and a low-friction coating 34. The flexible inner body 33 allows the cable 3 to be twisted and curved as desired by a user, such as when looping the cable 3 through a caught fish. The low-friction coating 34, which encases the flexible inner body 33, provides a smooth surface that minimizes the chances of a fish becoming stuck while being slid along the cable 3. The flexible inner body 33 of the cable 3 has a high tensile strength in the interests of durability, ensuring the present invention will be able to withstand prolonged use over long periods of time. In the preferred embodiment a steel construction is used to provide the tensile strength desired for the flexible inner body 33. A number of materials may be used for the low-friction coating 34, an example of which is polyurethane. The combination of flexible inner body 33 and low-friction coating 34 is illustrated in FIG. 10. An additional advantage provided by the combination of the flexible inner body 33 and low-friction coating 34, compared to commonly used nylon cables 3, is increased user comfort. Since fisherman often carry their catches by holding the cable 3, the nylon cables 3 can prove uncomfortable as they dig into a user's palms, leaving imprints and stressing the hand.

As heretofore described, the present invention utilizes a latching mechanism 23 and latch receptacle 12 to secure the insert 2 and locking body 1 to each other. A number of different implementations are possible, one example being the detent 24 configuration used by the preferred embodiment. The detent 24 comprises a flexible arm 25 and a tab 26. The flexible arm 25 connects the tab 26 to the tongue 22 and allows a degree of vertical movement. This provided freedom allows the flexible arm 25 and tab 26 to bend slightly to fit into the insert-receiving cavity 11, returning into an equilibrium position when the tab 26 is aligned with the latch receptacle 12 of the locking body 1. The latch receptacle 12 is a hole 14 that the tab 26 traverses through, thus preventing movement of the insert 2 with respect to the locking body 1. To disengage the latching mechanism 23 from the latch receptacle 12, a user simple presses down on the tab 26 in order to allow the tongue 22 to be pulled out of the insert-receiving cavity 11. An indent is positioned into the locking body 1 to help provide a tactile guide for a user wishing to depress the tab 26. The indent is sized to receive a user's fingertip, helping a user to quickly find and disengage the latching mechanism 23 without having to visually focus on the latching mechanism 23.

The design of the present invention allows the cable 3 to be formed into a closed loop in a manner such that the closed loop can be quickly and easily opened by the fisherman. The locking body 1 and its constituent components interact with the insert 2 and the latter's constituent components to allow a loop to easily be opened and closed. The loop is opened to allow fish to be secured to the cable 3, with the cable 3 and insert 2 being threaded through the mouth and gill slits of the fish. Once the fish is secured in this manner, the loop is closed in order to retain the fish. The loop can be opened and closed again to add more fish or to unload the fish from the cable 3.

A number of properties enhance the functionality of the present invention. For example, the insert 2 may be given a thin and elongated shape to make it easier for a user to thread said insert 2 through the mouth and gill slit of a fish. Injection molding can be used to singularly form the insert 2, increasing manufacturing efficiency and ease. The insert 2, as well as the locking body 1, can be constructed from a variety of materials, with plastics being one example of an economical and effective material choice. Other properties may be altered to provide increased options to potential customers. For example, the length of the cable 3 can be altered without detracting from the functionality of the present invention. The present invention could offer different cable 3 lengths to provide more choice, perhaps offering cable 3 lengths of five feet or ten feet. Ultimately, while cable 3 length is variable it is desirable for the cable 3 to be of sufficient length such that any fishes loaded onto the wire are below the water's surface when the second half is secured to the user at just above the waist and the user is in water up to about their knees.

Furthermore, a carabiner can be packaged as part of the present invention. By providing a carabiner it is assured that users have a fastener available for securing the ring 13 to another object, e.g. fisherman's apparel.

Although the invention has been explained in relation to its preferred embodiment, it is to be understood that many other possible modifications and variations can be made without departing from the spirit and scope of the invention as hereinafter claimed.

What is claimed is:

1. A snapping fish stringer comprising:
    a locking body;
    an insert;
    a cable;
    the insert being configured to be inserted into the locking body;
    the locking body comprising an insert-receiving cavity, a circular hole, an annular indent, an insertion end, a coupling end and a ring;
    the insert comprising a handle portion, a tongue, a U-shaped slot, a flexible arm and a circular tab;
    the cable comprising a first end, a second end, a flexible inner body and a low-friction coating;
    the insert-receiving cavity traversing into the locking body from the insertion end;
    the circular hole and the annular indent being positioned adjacent to the insert-receiving cavity;
    the ring being positioned opposite the insert-receiving cavity along the locking body at the coupling end opposite to the insertion end;
    the first end of the cable being connected to the insertion end of the locking body;
    the second end of the cable being connected to the handle portion of the insert;
    the first end and the second end being located adjacent to the insertion end of the locking body;
    wherein, in response to the insert being received in the locking body, a loop is formed from the insert along the cable and to the insertion end, rendering the first end and the second end parallel to each other;
    the flexible inner body being made of a steel material, the low-friction coating being made of a polyurethane material, such that the cable has high tensile strength;
    the flexible inner body being encased by the low-friction coating;
    the tongue traversing into the insert-receiving cavity, in response to the insert being inserted into the locking body;
    the circular hole traversing into the locking body from the insert-receiving cavity;
    the circular tab being connected to the tongue by the flexible arm;
    the flexible arm being formed by the U-shaped slot penetrating the tongue, such that the flexible arm and the circular tab are surrounded by the tongue;
    the circular tab traversing through the insert-receiving cavity, in response to the insert being inserted into the locking body;
    the circular tab being inserted in the circular hole, in response to the insert being inserted into the locking body; and
    the circular hole being surrounded by the annular indent.

* * * * *